(12) United States Patent
Kang et al.

(10) Patent No.: US 7,690,832 B2
(45) Date of Patent: Apr. 6, 2010

(54) BACKLIGHT ASSEMBLY, DISPLAY APPARATUS HAVING THE SAME AND METHOD FOR MANUFACTURING THE BACKLIGHT ASSEMBLY

(75) Inventors: Seock-Hwan Kang, Suwon-si (KR); Du-Hwan Chung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 256 days.

(21) Appl. No.: 11/777,400

(22) Filed: Jul. 13, 2007

(65) Prior Publication Data

US 2008/0013310 A1 Jan. 17, 2008

(30) Foreign Application Priority Data

Jul. 13, 2006 (KR) ...................... 10-2006-0065632

(51) Int. Cl.
*F21V 7/04* (2006.01)
*G02F 1/1333* (2006.01)

(52) U.S. Cl. ...................... 362/634; 362/632; 362/97.1; 349/58

(58) Field of Classification Search ......... 362/632–634, 362/249.07; 249/58, 61; 349/58, 61
See application file for complete search history.

(56) References Cited

U.S. PATENT DOCUMENTS

| 7,118,267 B2* | 10/2006 | Li et al. ...................... 362/632 |
| 7,287,895 B2* | 10/2007 | Lin et al. ...................... 362/633 |
| 2002/0093811 A1* | 7/2002 | Chen ........................... 362/31 |
| 2006/0103775 A1* | 5/2006 | Chung ......................... 349/58 |
| 2006/0227572 A1* | 10/2006 | Chen ........................... 362/633 |

* cited by examiner

*Primary Examiner*—Ali Alavi
(74) *Attorney, Agent, or Firm*—Cantor Colburn LLP

(57) ABSTRACT

A backlight assembly includes an optical unit including a lamp unit emitting light. The backlight assembly also includes a receiving container. The receiving container includes a plurality of side walls, a bottom plate separably combined with the side walls, and a combining element for combining the side walls with the bottom plate. The receiving container receives the optical unit in a receiving space defined by the side walls, the bottom plate, and the combining element.

20 Claims, 10 Drawing Sheets

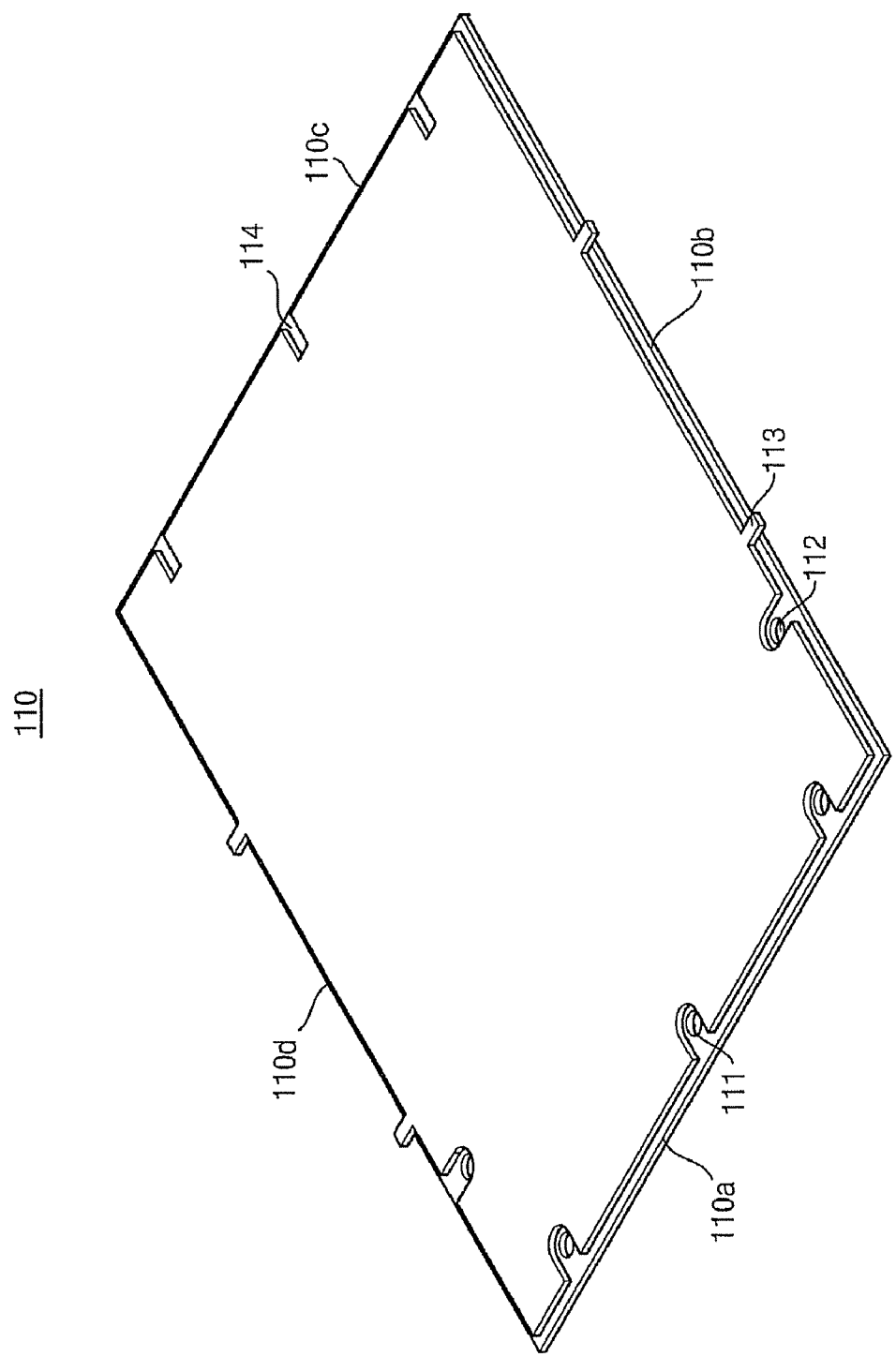

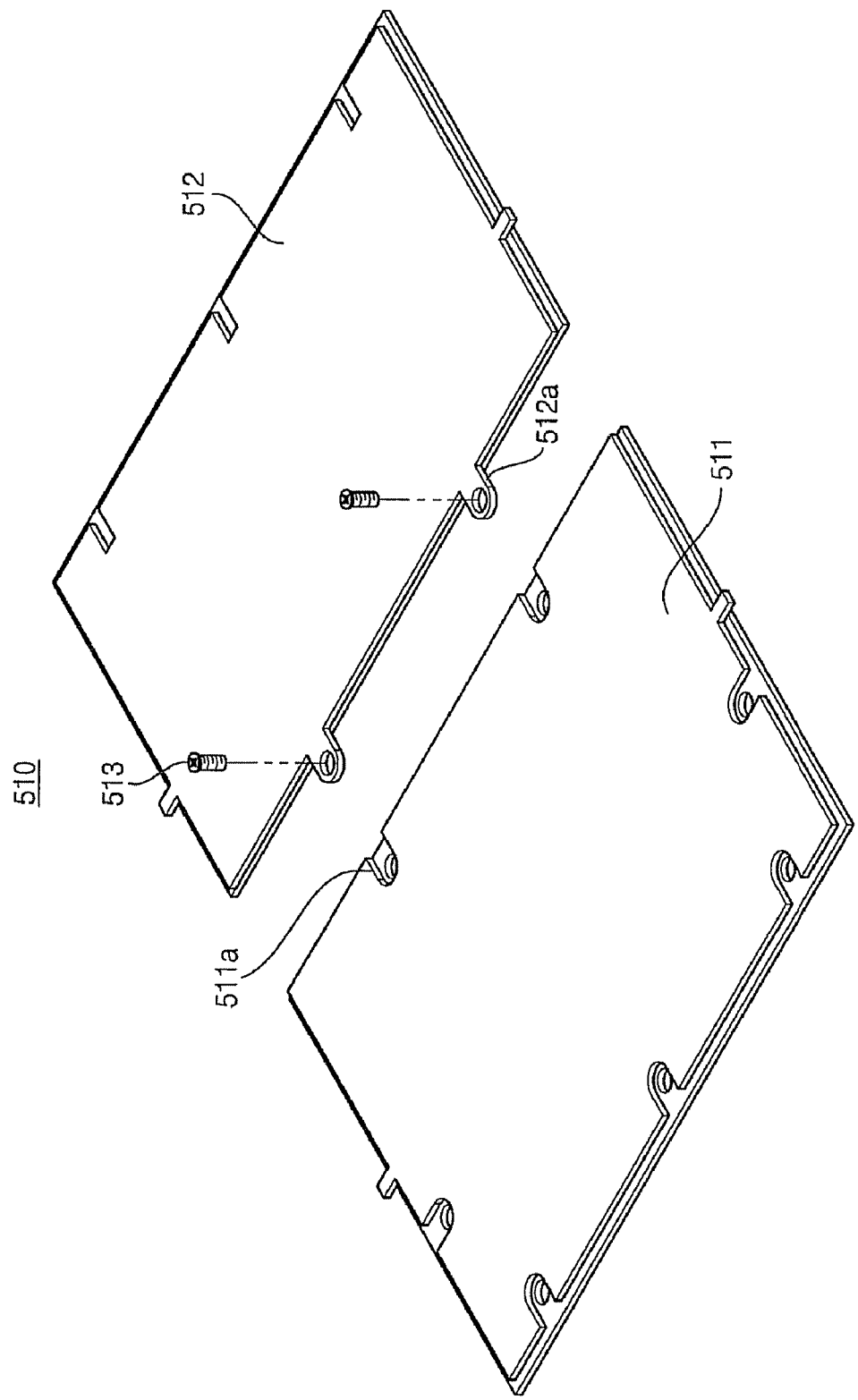

BACKLIGHT ASSEMBLY, DISPLAY APPARATUS HAVING THE SAME AND METHOD FOR MANUFACTURING THE BACKLIGHT ASSEMBLY

This application claims priority to Korean Patent Application No. 2006-65632, filed on Jul. 13, 2006, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly, a display apparatus having the backlight assembly and a method for manufacturing the backlight assembly. More particularly, the present invention relates to a reduced-weight backlight assembly capable of enhancing productivity, a display apparatus having the backlight assembly and a method for manufacturing the backlight assembly.

2. Description of the Related Art

Generally, a liquid crystal display "LCD" apparatus is a type of device that displays images using liquid crystal molecules. An LCD panel does not emit light by itself, but rather it receives external light for displaying an image. Generally, the LCD panel employs a backlight assembly that provides the LCD panel with the light. Backlight assemblies are classified as having either a direct-illumination type or an edge-illumination type according to a position of a lamp unit with respect to the assembly.

An LCD apparatus having the direct-illumination type includes a bottom chassis, a reflective plate, a lamp unit, a diffusion plate, a mold frame, an LCD panel and a top chassis. The bottom chassis is combined with a lower portion of the mold frame for fixing the lamp unit, maintaining a desired temperature by expelling heat generated by the lamp unit, and protecting the LCD apparatus from external impact.

LCD apparatuses have been increasing in size due, in part, to consumer demand. However, as the size of these LCD apparatuses increase, so will the size of the bottom chasses produced therefore. Thus, the weight of the bottom chassis increases in proportion to the size of apparatus. In addition, the size of press equipment for manufacturing the bottom chassis is increased in order to manufacture these larger sized bottom chasses. Particularly, when a side wall and a bottom plate of the bottom chassis are integrally manufactured, manufacturing costs for, and control over, the bottom chasses are greatly increased.

BRIEF SUMMARY OF THE INVENTION

Aspects of the present invention provide a backlight assembly having a receiving container of a reduced weight and enhanced productivity, and a display apparatus having the backlight assembly.

Further aspects of the present invention also provide a method for manufacturing the backlight assembly.

In one exemplary embodiment of the present invention, the backlight assembly includes an optical unit having a lamp unit, and a receiving container having a plurality of side walls, a bottom plate and a combining element.

The lamp unit emits light. The bottom plate is separably combined with the side walls. The combining element combines the side walls with the bottom plate. The receiving container receives the optical unit in a receiving space that is defined by the side walls, the bottom plate and the combining element.

The side walls and the bottom plate may be formed from substantially the same material, and both may include a metallic material. Alternatively, the side walls and the bottom plate may be formed from different materials from each other. For example, the side walls may be formed from a metallic material, and the bottom plate may be formed from polymer.

The side walls may be integrally formed, or each of side walls may be formed separately from each other and assembled to form the receiving space.

The bottom plate that may have an opening portion may be formed by assembling a plurality of pieces.

The receiving container may further include a lamp unit supporting element having a fixing groove for fixing the lamp unit, and a diffusion plate supporting protrusion. In addition, the receiving container may further include a lamp unit supporting element having a fixing groove. The fixing groove is simultaneously formed with the bottom plate and the side walls for fixing the lamp unit. The lamp unit supporting element may be integrally formed with the bottom plate.

In an example liquid crystal display (LCD) apparatus according to the present invention, the LCD apparatus includes a backlight assembly, a display unit and a first receiving container. The backlight assembly includes an optical unit and a second receiving container. The optical unit includes a lamp unit. The second receiving container includes a plurality of side walls, a bottom plate and a combining element. The backlight assembly supplies light. The display unit is disposed over the backlight assembly for displaying an image. The first receiving container fixes the display unit. The lamp unit emits the light. The bottom plate having a plate shape is separably combined with the side walls. The combining element combines the side walls with the bottom plate. The second receiving container receives the optical unit in a receiving space that is defined by the side walls, the bottom plate and the combining element.

The side walls and the bottom plate may be formed from substantially the same metallic material. The side walls and the bottom plate may be formed from different materials from each other. The side walls may be formed from a metallic material, and the bottom plate may be formed from a plastic based material.

The second receiving container may further include a lamp unit supporting element having a fixing groove for fixing the lamp unit, and a protrusion supporting a diffusion plate. The lamp unit supporting element may be integrally formed with the bottom plate.

In an exemplary embodiment of the present invention, a method for manufacturing the backlight assembly includes combining a plurality of side walls having a bottom plate by a combining element and disposing an optical unit in the receiving space that is defined by the side walls, the bottom plate and the combining element.

According to the present invention, since the side wall and the bottom plate of the bottom chassis are formed separately from each other, and thus defects of the lamp unit may be easily repaired and the lamp unit may be easily exchanged.

The bottom plate of the separately formed bottom chassis is divided into pieces and the bottom plate is manufactured by combining the pieces, or the bottom plate is formed to have the opening portion. Therefore, the bottom chassis may be integrally formed as the bottom chassis increases in size. The manufacturing costs for the bottom chassis and a total weight including the bottom chassis may be reduced. Additionally, elements required for repair and exchange thereof may be separately manufactured to reduce manufacturing time and costs.

Furthermore, since the bottom plate of the bottom chassis and the lamp unit supporting member are integrally formed, manufacturing time may be reduced. Since the bottom plate and the lamp unit supporting member are formed by a plastic injection mold manufacturing process, the manufacturing costs and time may be reduced and reliability of products may be enhanced in mass production.

BRIEF DESCRIPTION OF THE DRAWINGS

The above and other aspects, features, and advantages of the present invention will become more apparent by describing in detailed example embodiments thereof with reference to the accompanying drawings, in which:

FIG. 3A is a perspective view illustrating a bottom plate according to a first exemplary embodiment of the bottom chassis shown in FIG. 1;

FIG. 3B is a perspective view illustrating a bottom plate according to a second exemplary embodiment of the bottom chassis shown in FIG. 1;

DESCRIPTION OF THE EMBODIMENTS

Figure 1:
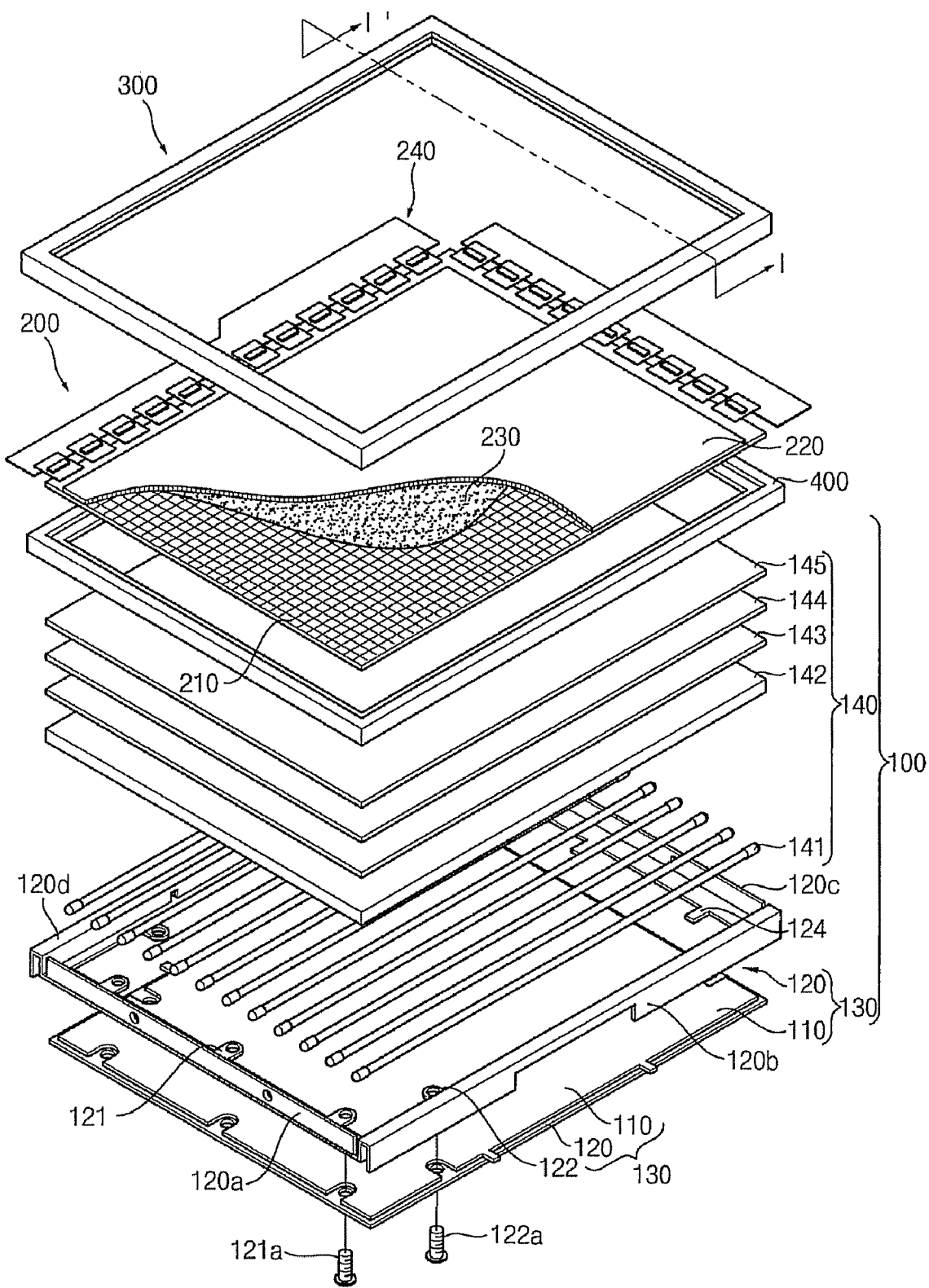
FIG. 1 is an exploded perspective view illustrating a liquid crystal display "LCD" apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
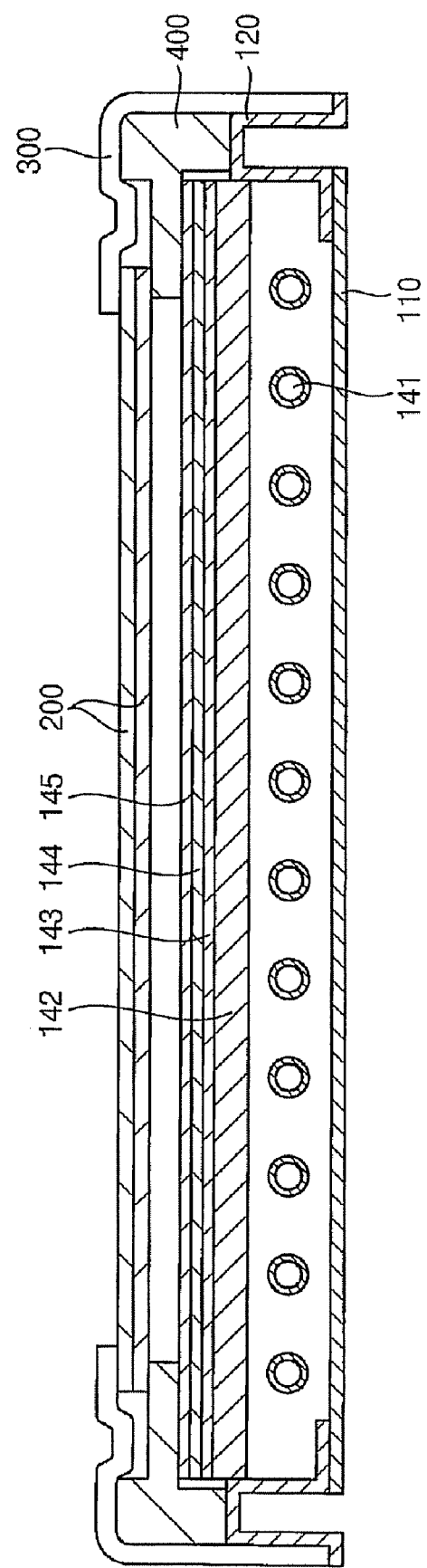
FIG. 2 is a cross-sectional view taken along the line I-I' in FIG. 1.

FIG. 1 is an exploded perspective view illustrating a liquid crystal display (LCD) apparatus according to an exemplary embodiment of the present invention, and FIG. 2 is a cross-sectional view taken along the line I-I' in FIG. 1.

Referring to FIGS. 1 and 2, the LCD apparatus 700 according to an exemplary embodiment of the present invention includes a backlight assembly 100, a display unit 200 and a first receiving container 300 (also referred to herein as "top chassis"). The LCD apparatus 700 may further include a mold frame 400.

The backlight assembly 100 includes a second receiving container 130 (also referred to herein as "bottom chassis") and an optical unit 140. In an exemplary embodiment, the bottom chassis 130 includes a plurality of side walls 120a, 120b, 120c and 120d (collectively referred to herein as "sidewalls 120"), a bottom plate 110 and combining elements 121a and 122a. The side walls 120a, 120b, 120c and 120d, and the bottom plate 110 are formed separately from each other and are combined with each other by the combining elements 121a and 122a to form the bottom chassis 130.

Each of side walls 120a, 120b, 120c and 120d may be formed separately from each other. Alternatively, adjacent side walls 120a and 120b and/or adjacent side walls 120c and 120d may be integrally formed. In alternative embodiments, all of side walls 120a, 120b, 120c and 120d may be integrally formed. As illustrated in FIG. 1, a combination of bolts and nuts may be used as the combining elements 121a and 122a. Alternatively, the sidewalls 120 may be combined using bosses and grooves or bosses and holes.

In exemplary embodiments, the side walls 120a, 120b, 120c and 120d, and the bottom plate 110 are combined by the combining elements 121a and 122a to define a receiving space. The receiving space receives the optical unit 140. The bottom chassis 130 receiving the optical unit 140 is combined with the top chassis 300 and the mold frame 400 for supporting and fixing the optical unit 140.

The optical unit 140 includes a lamp unit 141, a diffusion plate 142, a diffusion sheet 143 and condensing sheets 144 and 145 for supplying a uniform light to the Display unit 200. The lamp unit 141 is disposed under the diffusion plate 142 for emitting the light to display an image. The diffusion plate 142 and the diffusion sheet 143 are disposed over the lamp unit 141 so that the diffusion plate 142 is spaced apart from the lamp unit 141 by a predetermined distance in order to convert the light from the lamp unit 141 into the light having a uniform brightness, and to emit the light to the Display unit 200. The condensing sheets 144 and 145 condense the light that passes through the diffusion plate 142 and the diffusion sheet 143 to provide the uniform brightness toward a desired direction, thereby enhancing light efficiency.

A reflecting plate (not shown) may be disposed under the lamp unit 141 to reflect the leaked light, which is not incident into the diffusion plate 142, toward the diffusion plate 142. When the lamp unit 141 is received in the receiving space of the bottom chassis 130, a lamp unit fixing portion (not shown) is used to fix or support the lamp unit within the bottom chassis 130. In addition, when the diffusion plate 142, a diffusion sheet 143 and condensing sheets 144 and 145 are disposed on and fixed to a stepped portion (not shown) formed at an edge of the side wall 120 of the bottom chassis 130, a diffusion supporting portion (not shown) may be formed on the receiving space of the bottom chassis 130 for fixing or supporting the diffusion plate 142, a diffusion sheet 143 and condensing sheets 144 and 145.

Although not shown in the figure, the optical unit 140 may include a plurality of point light sources (not shown). For example, the point light sources may include light emitting diodes (LEDs). In this case, the optical unit 140 may preferably include a base substrate on which the point light sources are mounted. For example, the base substrate may include a printed circuit board (PCB), and a control circuit may be printed on the base substrate to control the point light sources.

The display unit 200 includes a liquid crystal 230 disposed between two substrates 210 and 220. The display unit 200 changes electrical and optical characteristics of the liquid crystal by using the light incident from the backlight assembly 100 for displaying the image. Edges of the display unit 200 are fixed and supported by the top chassis 300 and the mold frame 400.

The top chassis 300 has a rectangular parallelepiped box shape, and a bottom surface of the top chassis 300 has an opening portion. The top chassis 300 is disposed over the display unit 200 for covering an effective display area of the display unit 200, thereby making the effective display area open. The top chassis 300 is combined with the mold frame 400 and the bottom chassis 130 to fix the display unit 200 to the mold frame 400.

The mold frame 400 has the rectangular parallelepiped box shape, and a bottom surface of the mold frame 400 has the opening portion. The mold frame 400 is disposed under the display unit 200 and over the optical unit 140, and combined with the top chassis 300 and the bottom chassis 130 for supporting and receiving the display unit 200.

FIG. 3A is a perspective view illustrating a bottom plate according to a first exemplary embodiment of the bottom chassis shown in FIG. 1.

The bottom chassis 130, according to the present exemplary embodiment, includes a bottom plate 110, side walls 120 and combining elements 121a and 122a, and the side walls 120 include a first side wall 120a, a second side wall 120b, a third side wall 120c and a fourth side wall 120d.

Referring to FIG. 3A, the bottom plate 110 is formed separately from the side walls 120a, 120b, 120c and 120d, and has a plate shape. As mentioned above, the lamp unit 141 is received in the receiving space that is defined by the bottom chassis 130, and the lamp unit 141 is formed on the bottom plate 110 of the bottom chassis 130 with a lamp unit fixing member (not shown). Thus configured, the lamp unit 141 formed on the bottom plate 110 may be separated from the receiving space if necessary, in order to facilitate access thereto and repair. For example, access to the lamp unit through the bottom plate 110 facilitates repair of lamp defects, as well as the exchange of the lamp unit 141.

Alternatively, as mentioned above, the optical unit 140 may include the point light sources (not shown). In this case, the point light sources and the base substrates (not shown) on which the point light sources are mounted, may be received in the receiving space that is defined by the bottom chassis 130, and may be disposed on the bottom plate 110 of the bottom chassis 130 with a point light source fixing member (not shown). Thus configured, the point light sources and the base substrates disposed on the bottom plate 110 may be separated from the receiving space if necessary, in order to facilitate access thereto and repair. Since the bottom plate 110 is separately formed from the side walls 120, the combining elements 121a and 122a are used to combine the bottom plate 110 to the side walls 120. In an exemplary embodiment, the bottom plate 110 has bottom plate grooves 111, 112 and 114, and bottom plate protrusions 113 at four edges of the bottom plate 110.

For example, the first bottom plate grooves 111 may be formed at a first edge 110a of the bottom plate 110. The first bottom plate grooves 111 are combined with first side wall protrusions 121 formed at the side wall 120 through the first combining elements 121*a*. The combining elements 121*a* may include a bolt, a boss, etc. The shape and number of the first bottom plate grooves 111 and the first side wall protrusions 121 may vary according to the size of the bottom plate 110 in order to fix the bottom plate 110 and the side walls 120.

The second bottom plate grooves 112 are formed at a second edge 110*b* of the bottom plate 110, and the bottom plate protrusions 113 are formed at a fourth edge 110*d* of the bottom plate 110. The second bottom plate grooves 112 are combined with second side wall protrusions 122 formed at the side wall 120 through the second combining elements 122*a*, and the combining method used therein may be substantially the same as that used in the first combining elements 121*a*. The bottom plate protrusions 113 are formed at the second and fourth edges 110*b* and 110*d* of the bottom plate 110 in parallel with a bottom plate direction, and are protruded by a predetermined distance and corresponding to side wall grooves 123 (as shown, e.g., in FIG. 4) formed at the second and fourth side walls 120*b* and 120*d*. Since the bottom plate protrusions 113 are protruded by a predetermined distance along the bottom plate direction, when the bottom plate 110 is combined with the side walls 120, the bottom plate protrusions 113 make first contact with the sidewalls 120.

The third bottom plate grooves 114 are formed at a third edge 110*c* of the bottom plate 110. The bottom plate grooves 114 are combined with third side wall protrusions 124 formed at the side wall 120 using, e.g., a boss and groove combining method. By tight fitting, the boss and groove combining method tightly combines the bottom plate 110 with the side wall 120. As mentioned above, the shape and number of the third bottom plate grooves 114 and the third side wall protrusions 124 may vary according to the size of the bottom plate 110 in order to fix the bottom plate 110 and the side walls 120.

The bottom plate 110 is combined with the side walls 120 using the various combining elements for forming the receiving space.

FIG. 3B is a perspective view illustrating a bottom plate according to a second exemplary embodiment of the bottom chassis shown in FIG. 1.

Referring to FIG. 3B, a bottom plate 510 according to the second exemplary embodiment of the present invention may be formed by assembling together a first bottom plate 511 and a second bottom plate 512 after separately manufacturing the first bottom plate 511 and the second bottom plate 512. The first and second bottom plates 511 and 512 are formed with first bottom plate grooves 511*a* and second bottom plate protrusions 512*a*. The first bottom plate grooves 511*a* are combined with the second bottom plate protrusions 512*a* using a bottom plate combining element 513. A bolt and nut combination may be used for the combination as illustrated in FIG. 3B, and alternatively, a boss and groove or a boss and hole combination may be used. It will be understood that one or more additional combining elements may be used for providing increased combination strength.

Two bottom plates 511 and 512 are manufactured and assembled to form the bottom plate 510 in the embodiment shown in FIG. 3B. However, it will be understood that more than two bottom plates may be separately manufactured, and then assembled to form the bottom plate 510, in order to accommodate larger assemblies and provide greater reinforcement of the bottom chasses. As such, elements required for repairing and exchanging thereof may be separately manufactured.

Figure 3C:
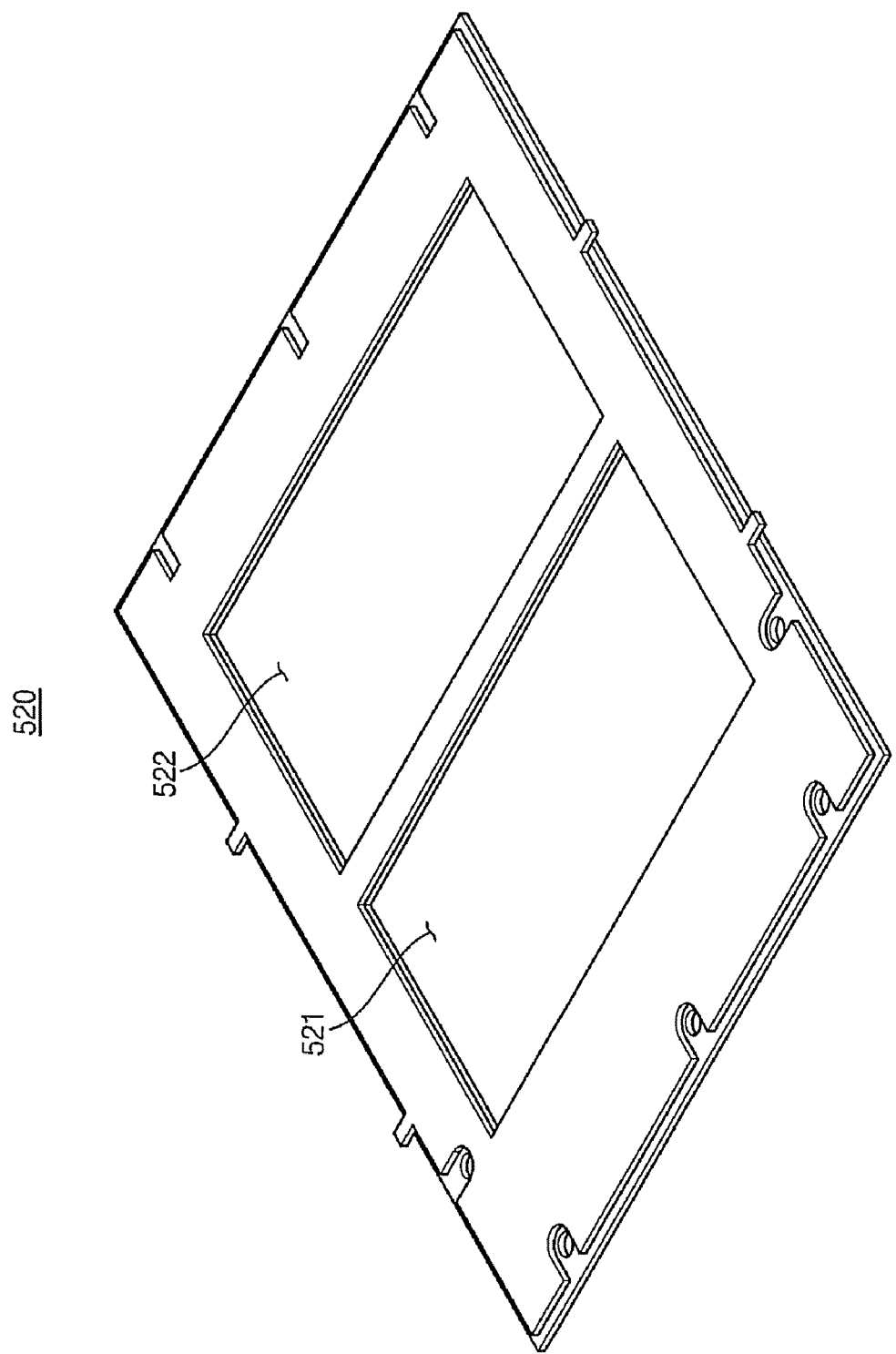
FIG. 3C is a perspective view illustrating a bottom plate according to a third exemplary embodiment of the bottom chassis shown in FIG. 1.

FIG. 3C is a perspective view illustrating a bottom plate according to a third exemplary embodiment of the bottom chassis shown in FIG. 1.

Referring to FIG. 3C, a bottom plate 520 according to the third exemplary embodiment of the present invention may be formed to have a first opening portion 521 and a second opening portion 522. The first opening portion 521 and the second opening portion 522 may be formed at a predetermined location on the bottom plate 520 except for a location where the side walls 120 are combined with the bottom plate 520 and where the lamp unit fixing member (not shown) is fixed for supporting the lamp unit 141. In addition, when the optical unit 140 includes the point light sources (not shown) and the base substrate (not shown), the first and second opening portions 521 and 522 may be formed at the predetermined location on the bottom plate 520 except for the location where the point light source fixing member (not shown) is fixed for supporting the point light sources and the base substrate. As illustrated in FIG. 3C, two opening portions 521 and 522 may be formed. However, it will be understood that a single opening portion or more than two opening portions may also be formed on the bottom plate 520 in order to realize the advantages of the invention. As long as the opening portion does not impede a combination between the side walls 120 and the fixation of the lamp unit, the opening portion may be variously formed on the bottom plate 520. Manufacturing the bottom plate 520 to include an opening portion serves to reduce the overall weight of the assembly and reduces the amount of materials required to manufacture the bottom plate, which results in reduced manufacturing costs.

Figure 4:
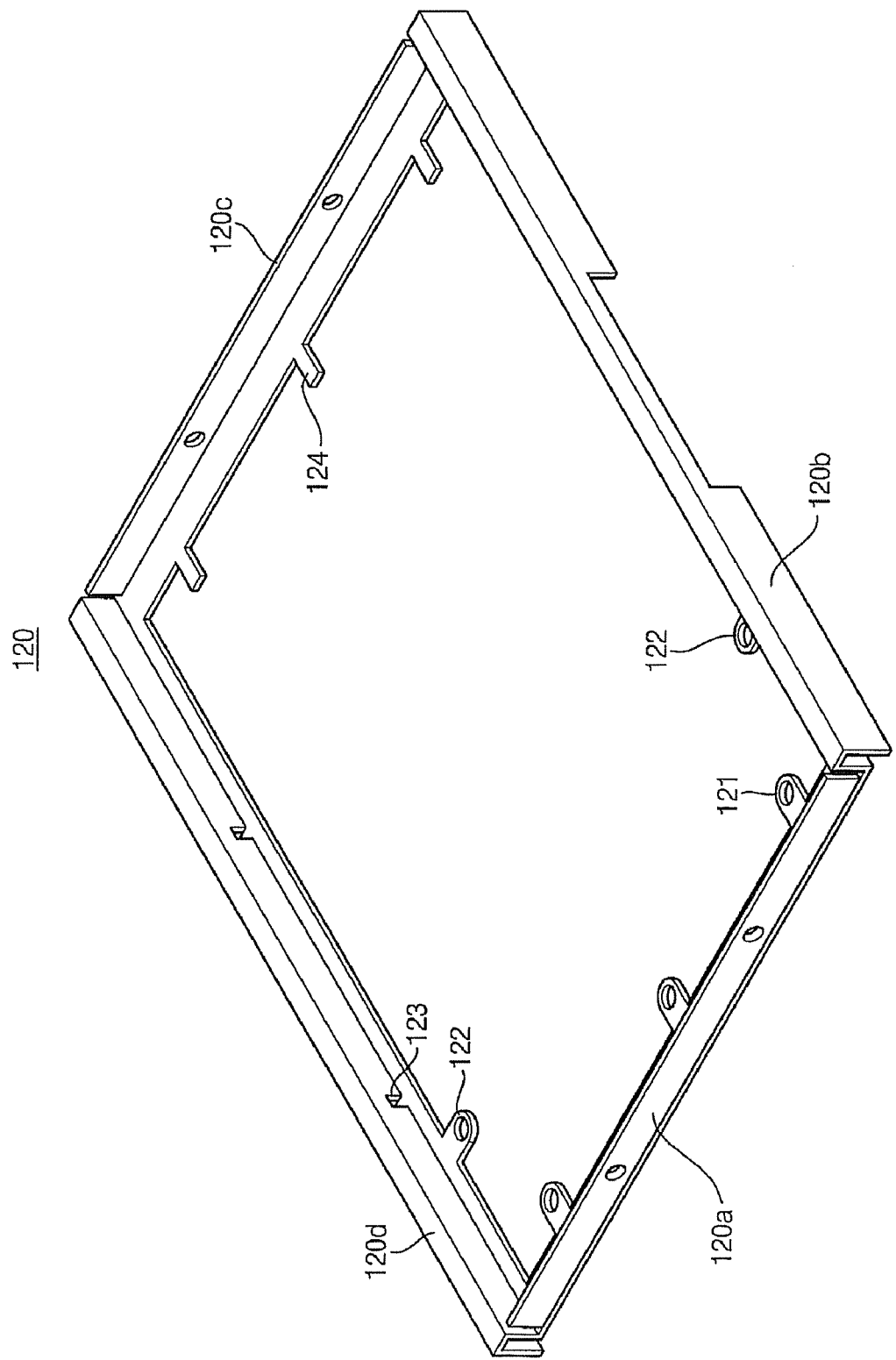
FIG. 4 is a perspective view illustrating a side wall of the bottom chassis shown in FIG. 1.

FIG. 4 is a perspective view illustrating a side wall of the bottom chassis shown in FIG. 1.

Referring to FIG. 4, the side walls 120 are formed separately from the bottom plate 110. In an exemplary embodiment, the side walls 120 have a rectangular parallelepiped shape, and a bottom surface of the side walls 120 has an opening portion. The side walls 120 include a first side wall 120*a*, a second side wall 120*b*, a third side wall 120*c* and a fourth side wall 120*d*. Each side wall 120 may be separately manufactured and assembled, to form the receiving space. Although not shown in FIG. 4, each of the side walls 120*a*, 120*b*, 120*c* and 120*d* may be formed separately from each other and assembled with each other to form the side walls 120. The first and second side walls 120*a* and 120*b* may be integrally formed, and the third and fourth side walls 120*c* and 120*d* may be integrally formed, all of which may be then assembled to form the side walls 120. The first and fourth side walls 120*a* and 120*d* may be integrally formed, and the second and third side walls 120*b* and 120*c* may be integrally formed, all of which may be then assembled to form the side walls 120. Alternatively, the first, second, third and fourth side walls 120*a*, 120*b*, 120*c* and 120*d* may be integrally formed.

In a cross-sectional view, the second and fourth side walls 120*b* and 120*d* have a U-shape (as shown, e.g., in FIG. 2) for combining the second and fourth side walls 120*b* and 120*d* with the bottom plate 110. The U-shape of the side walls 120 enable partial absorption of an impact or a vibration along a longitudinal direction of the sidewalls 120*b* and 120*d* to prevent the backlight assembly 100 having the lamp unit 141 in the receiving space from being twisted along the longitudinal direction. In addition, the side walls having a U-shape are combined with both the top chassis 300 and the mold frame 400 so as to increase the combination strength, thereby integrally and securely forming the LCD apparatus.

The side walls 120 may include the stepped portion (not shown) for supporting and fixing the diffusion plate 142, the diffusion sheet 143 and the condensing sheets 144 and 145.

As explained above, the side walls 120 may be separately formed from the bottom plate 110. Thus, the combining elements 121a and 122a are used to combine the side wall 120 with the bottom plate 110. The side walls 120 include the side wall protrusions 121, 122 and 124, and the side wall grooves 123.

The first side wall protrusions 121 formed at the first side wall 120a are combined with the first bottom plate groove 111 formed at the first edge 110a of the bottom plate 110 through the first combining element 121a. As explained above, detailed descriptions of the combining method will be omitted.

The second side wall protrusions 122 formed at the second and fourth side walls 120b and 120d are combined with the second bottom plate grooves 112 formed at the second and fourth edges 110b and 110d of the bottom plate 110 through the second combining element 122a. The side wall grooves 123 are combined with the bottom plate protrusions 113. As explained above, detailed descriptions of the combining method will be omitted too.

In addition, the third side wall protrusions 124 formed at the third side wall 120c are combined with the third bottom plate grooves 114 formed at the third edge 110c of the bottom plate 110 through the bosses and grooves. As explained above, detailed descriptions of the combining method will be omitted for brevity.

The side walls 120 and the bottom plate 110 may be formed from substantially the same material, but alternatively, may include different materials from each other. When the side walls 120 and the bottom plate 110 are formed from substantially the same material, both of the side walls 120 and the bottom plate 110 may include a metallic material to ground the lamp unit 141. As the sidewalls 120 and the bottom plate 110 are separately formed, a malfunctioning lamp 141 unit within the bottom chassis 130 may be easily repaired or exchanged since this configuration enables easy access to the lamp unit 141.

When the side walls 120 and the bottom plate 110 are formed from different materials, one of the side walls 120 and the bottom plate 110 may include the metallic material for grounding the lamp unit 141. In order to reduce material costs, minimize product weight, and ensure stable combination of the LCD apparatus, the side walls 120 may be formed from the metallic material, and the bottom plate 110 may be formed from a plastic based material. Generally, side walls 120 formed from metallic material are mainly manufactured using a press process, while bottom plates 110 formed of plastic material are generally manufactured using an injection mold manufacturing process. However, when the bottom plate 110 is manufactured using the injection mold manufacturing process, the manufacturing costs and time may be decreased and the reliability of products produced may be enhanced in mass production, thereby increasing productivity.

Alternatively, the side walls 120 and the bottom plate 110 may be formed from different metallic materials. For example, in order to reduce manufacturing costs, the side walls 120 may be formed from a low-priced metallic material, and the bottom plate 110 may be formed from aluminum (Al).

Figure 5A:
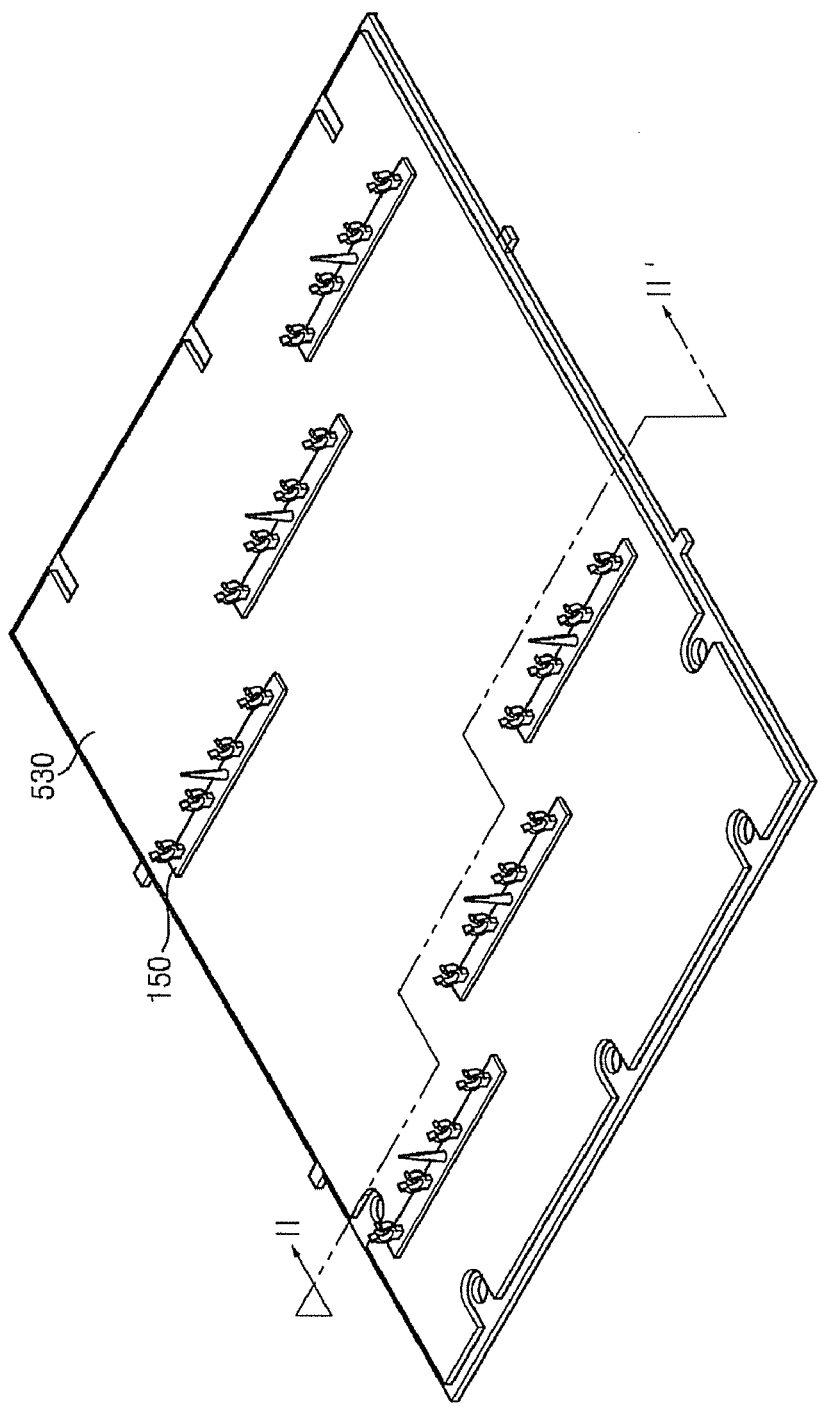
FIG. 5A is a perspective view illustrating a bottom plate of a bottom chassis according to another exemplary embodiment of the present invention.
Figure 5B:
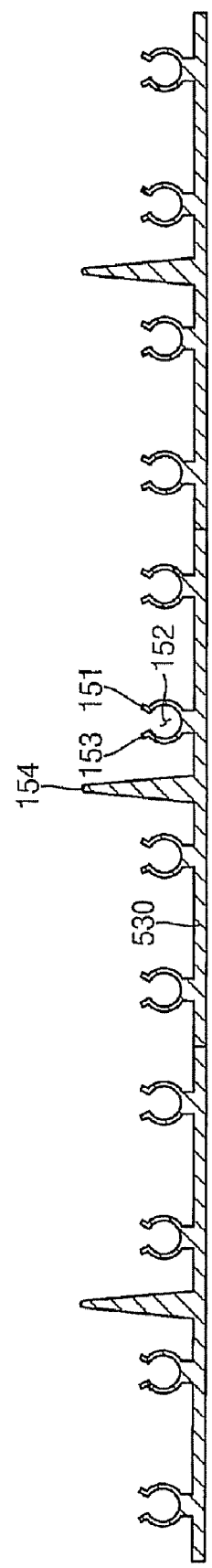
FIG. 5B is a cross-sectional view taken along the line II-II' in FIG. 5A.

FIG. 5A is a perspective view illustrating a bottom plate of a bottom chassis according to another exemplary embodiment of the present invention, and FIG. 5B is a cross-sectional view taken along the line II-II' in FIG. 5A.

Referring to FIGS. 5A and 5B, the bottom plate 530 of the bottom chassis according to the present example embodiment includes a plurality of first lamp unit supporting elements 150. The first lamp unit supporting elements 150 are integrally formed with the bottom plate 530 on the bottom plate 530 for fixing and supporting the lamp unit 141. The first lamp unit supporting elements 150 may be formed at a predetermined location on the bottom plate 530 based upon the length and number of the lamps. However, as illustrated in FIG. 5A, each of first lamp unit supporting elements 150 may be separated from each other by a predetermined distance for uniformly disposing the lamp.

Each of first lamp unit supporting elements 150 includes at least one of a first lamp fixing member 151, a second lamp fixing member 153 and a diffusion plate supporting protrusion 154. The first and second lamp fixing members 151 and 153, and the diffusion plate supporting protrusion 154 are formed on the bottom plate 530. For example, each of the first lamp unit supporting elements 150 includes four first lamp fixing members 151, four second lamp fixing members 153 and one diffusion plate supporting protrusion 154.

The first lamp fixing member 151 is extended from the bottom plate 530 and the cross-sectional shape of the first lamp fixing member 151 is a half circular shape for fixing the lamp unit 141. The first lamp fixing member 151 defines a groove 152 (also referred to herein as "fixing groove") with the second lamp fixing member 153 for fixing the lamp unit 141. In addition, the first lamp fixing members 151 are formed so that the first lamp fixing members 151 are spaced apart from each other by a predetermined distance for uniformly disposing the lamp unit 141 by the predetermined distance.

The second lamp fixing member 153 is extended from the bottom plate 530 and the first lamp fixing member 151, and the cross-sectional shape of the second lamp fixing member 153 is the half circular shape for fixing the lamp unit 141. The second lamp fixing member 153 defines a groove 152 with the first lamp fixing member 151 for fixing the lamp unit 141. The second lamp fixing member 153 is connected to and faced with the first lamp fixing member 151, and the first and second lamp fixing members 151 and 153 are symmetric to each other. The second lamp fixing member 153 is separated from the first lamp fixing member 151 by a predetermined distance, based upon a diameter of the lamp for fixing the lamp unit 141 to the groove 152 between the first and second lamp fixing members 151 and 153. The second lamp fixing members 153 are formed such that the second lamp fixing members 153 are spaced apart from each other by the predetermined distance for fixing the lamp unit to the groove 152.

In an exemplary embodiment, the protrusion 154 supporting a diffusion plate 142 is extended from the bottom plate 530 and is protruded higher than the first and second lamp fixing members 151 and 153 for supporting the diffusion plate 142. As the size of the diffusion plate 142 increases, a center portion of the diffusion plate 142 may sag toward the bottom plate 530. The protrusion 154 prevents the diffusion plate 142 from sagging, thereby uniformly maintaining a separated distance between the diffusion plate 142 and the lamp unit 141 that is fixed by the first and second lamp fixing members 151 and 153. For example, the protrusion 154 supporting the diffusion plate 142 may be a conic shape.

Since the first lamp unit supporting elements 150 are integrally formed with the bottom plate 530, the first lamp unit supporting elements 150 may be formed from a material substantially the same as that used in the bottom plate 530. As mentioned above, since the bottom plate 530 may include a polymer material, the first lamp unit supporting elements 150 may also be formed from a polymer material for being integrally formed with the bottom plate 530 by using the injection mold manufacturing process. Therefore, the manufacturing costs and time may be decreased, the reliability of products may be enhanced in mass production and some steps for manufacturing may be omitted, thereby maximizing productivity.

Figure 6A:
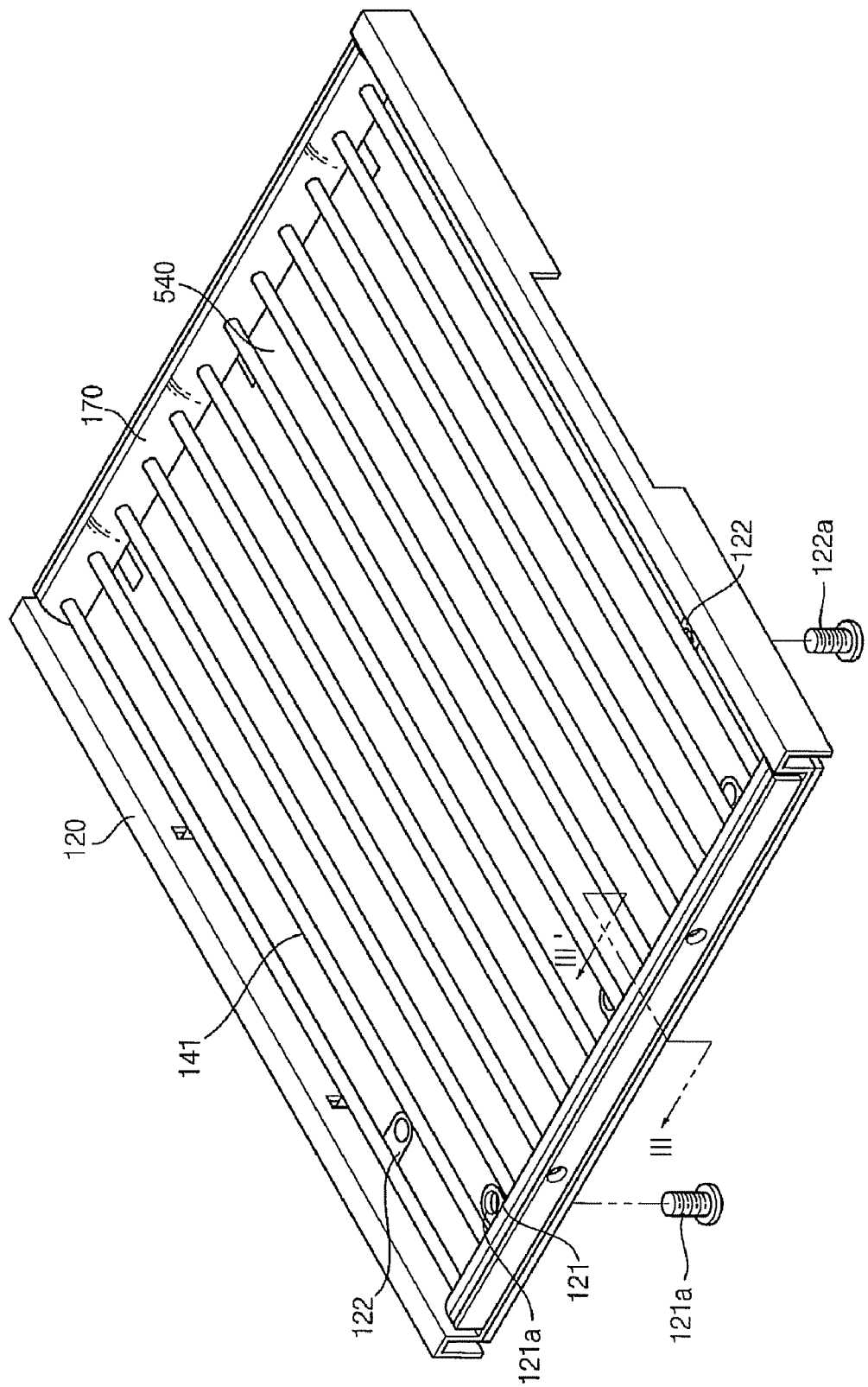
FIG. 6A is a perspective view illustrating a bottom chassis according to still another exemplary embodiment of the present invention.
Figure 6B:
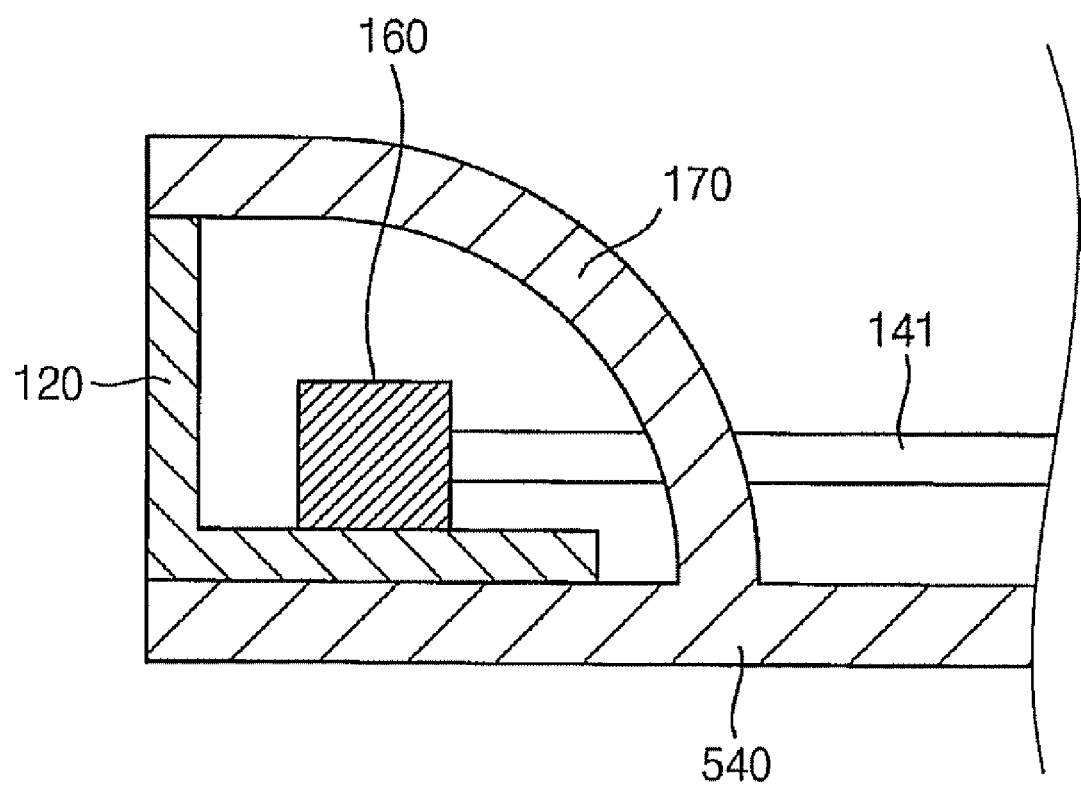
FIG. 6B is a cross-sectional view taken along the line III-III' in FIG. 6A.

FIG. 6A is a perspective view illustrating a bottom chassis according to still another exemplary embodiment of the present invention, and FIG. 6B is a cross-sectional view taken along the line III-III' in FIG. 6A.

Referring to FIGS. 6A and 6B, the bottom plate 540 of the bottom chassis according to the exemplary embodiment includes a plurality of second lamp unit supporting elements 160 and a plurality of third lamp unit supporting elements 170. The second lamp unit supporting elements 160 are disposed on a region where the bottom plate 540 overlaps with a portion of the sidewalls 120, the portion being extended from an edge of the side walls 120. Each of the second lamp unit supporting elements 160 has for example, a rectangular parallelepiped shape, and includes one opening portion having a circle shape to receive one lamp. Alternatively, each of the second lamp unit supporting elements 160 may have a plurality of opening portions to receive the lamps.

The second lamp unit supporting elements 160 are respectively disposed at both ends of the bottom plate 540 for fixing both ends of the lamp. The length of the lamp is extended in proportion to the size of a display apparatus. Based upon the length, the lamp may sag at a center portion of the lamp. To prevent sagging, the bottom plate 540 according to the present exemplary embodiment may further include the third lamp unit supporting elements 170. The third lamp unit supporting elements 170 also fix and support the lamp more efficiently.

The third lamp unit supporting elements 170 cover the second lamp unit supporting elements 160, and the cross-section of the third lamp unit supporting elements 170 has an arch shape. The third lamp unit supporting elements 170 are respectively extended from the both ends of the bottom plate 540 and are combined with an upper end of the side walls 120. The third lamp-unit-supporting elements 170 include an opening portion arranged in parallel with the bottom plate 540, such that that the lamp is inserted into the opening portion. The lamp inserted into the opening portion is supported by the third lamp unit supporting elements 170. The third lamp unit supporting elements 170 may include a plurality of opening portions corresponding to the number of the lamps. The opening portions of the third lamp unit supporting elements 170 are arranged in parallel with the opening portions of the second lamp unit supporting elements 160, so that each lamp is inserted in parallel with the bottom plate 540 and in parallel with each other.

For example, considering a simplified assembly and manufacturing process, the third lamp unit supporting elements 170 are extended from the bottom plate 540 and integrally formed with the bottom plate 540 on the bottom plate 540. When the third lamp unit supporting elements 170 are integrally formed with the bottom plate 540, the third lamp unit supporting elements 170 may be formed from substantially the same material as the bottom plate 540.

As mentioned above, since the bottom plate 540 may be formed from a polymer material, the third lamp unit supporting elements 170 may also be formed from a polymer material, and may be integrally formed with the bottom plate 540 by using the injection mold manufacturing process. As a result, the manufacturing costs and time may be reduced, the reliability of products produced may be enhanced in mass production, and some manufacturing steps may be omitted, thereby enhancing productivity. According to the present invention, since the side wall and the bottom plate of the bottom chassis are formed to be separated from each other, defects to the lamp unit may be easily repaired and exchanged.

The bottom plate of the separately formed bottom chassis is divided into pieces and the bottom plate is manufactured by combining the pieces, or the bottom plate is formed to have the opening portion. Therefore, the bottom plate of the bottom chassis may be integrally formed with the lamp unit fixing member as a size of the bottom chassis increases, to thereby reduce the required manufacturing time. As a result, manufacturing costs for the bottom chassis and total weight thereof including the bottom chassis may be reduced. Elements required for repair and exchange thereof may be separately manufactured to reduce repair time and associated costs.

Furthermore, since the bottom plate of the bottom chassis and the lamp unit supporting member are integrally formed, manufacturing time may be reduced. Since the bottom plate and the lamp unit supporting member are formed by an injection mold manufacturing process, the manufacturing costs and time may be reduced and the reliability of products may be enhanced in mass production.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A backlight assembly comprising:
an optical unit including a lamp unit which emits light; and
a receiving container including a plurality of side walls, a bottom plate having a plate shape, the bottom plate being separable, non-unitary and divisible from the side walls and combined with the side walls, and a combining element which combines the side walls with the bottom plate, wherein the receiving container receives the optical unit in a receiving space defined by the side walls, the bottom plate and the combining element.

2. The backlight assembly of claim 1, wherein the side walls and the bottom plate are formed from substantially the same material.

3. The backlight assembly of claim 2, wherein the side walls and the bottom plate are formed from a metallic material.

4. The backlight assembly of claim 1, wherein the side walls are formed from a material that is different than a material used to form the bottom plate.

5. The backlight assembly of claim 4, wherein the side walls are formed from a metallic material, and the bottom plate is formed from a polymer material.

6. The backlight assembly of claim 1, wherein the side walls are integrally formed.

7. The backlight assembly of claim 1, wherein the side walls are formed separately from each other and assembled to define the receiving space.

8. The backlight assembly of claim 1, wherein the bottom plate is formed by assembling a plurality of plates.

9. The backlight assembly of claim 8, wherein an opening portion is formed on the bottom plate.

10. The backlight assembly of claim 1, wherein the receiving container further comprises a lamp unit supporting element having a fixing groove for fixing the lamp unit and a protrusion supporting a diffusion plate, and the lamp unit supporting element is combined with the bottom plate.

11. The backlight assembly of claim 10, wherein the lamp unit supporting element is integrally formed with the bottom plate.

12. The backlight assembly of claim 1, wherein the receiving container further comprises a lamp unit supporting element having a fixing groove for fixing the lamp unit, and the lamp unit supporting element is combined with the bottom plate and the side walls.

13. The backlight assembly of claim 12, wherein the lamp unit supporting element is integrally formed with the bottom plate.

14. A liquid crystal display (LCD) apparatus comprising:
a backlight assembly which supplies light;
a display unit disposed over the backlight assembly; and
a first receiving container which fixes the display unit,
wherein the backlight assembly comprises:
   an optical unit including a lamp unit which emits the light; and
   a second receiving container including a plurality of side walls, a bottom plate having a plate shape, the bottom plate being separable, non-unitary and divisible from the side walls and combined with the side walls, and a combining element which combines the side walls with the bottom plate, wherein the second receiving container receives the optical unit in a receiving space defined by the side walls, the bottom plate and the combining element.

15. The LCD apparatus of claim 14, wherein the side walls and the bottom plate are formed from substantially the same metallic material.

16. The LCD apparatus of claim 14, wherein the side walls are formed from a material that is different than a material used to form the bottom plate.

17. The LCD apparatus of claim 16, wherein the side walls are formed from a metallic material, and the bottom plate is formed from a polymer material.

18. The LCD apparatus of claim 14, wherein the second receiving container further comprises a lamp unit supporting element having a fixing groove for fixing the lamp unit, and a protrusion supporting a diffusion plate, and the lamp unit supporting element is combined with the bottom plate.

19. The LCD apparatus of claim 18, wherein the lamp unit supporting element is integrally formed with the bottom plate.

20. A method for manufacturing a backlight assembly, the method comprising:
   combining a plurality of side walls with a bottom plate, which is separable, non-unitary and divisible from the side walls, by a combining element; and
   disposing an optical unit in a receiving space that is defined by the side walls, the bottom plate and the combining element.

* * * * *